(12) United States Patent
Hayashi et al.

(10) Patent No.: US 7,145,999 B2
(45) Date of Patent: Dec. 5, 2006

(54) INCOMING CALL FORWARDING COMMUNICATION SYSTEM AND THE METHOD

(75) Inventors: Yasuhisa Hayashi, Yokohama (JP); Masami Yabusaki, Kashiwa (JP)

(73) Assignee: NTT DoCoMo, Inc., Tokyo (JP)

( * ) Notice: Subject to any disclaimer, the term of this patent is extended or adjusted under 35 U.S.C. 154(b) by 87 days.

(21) Appl. No.: 09/987,550

(22) Filed: Nov. 15, 2001

(65) Prior Publication Data

US 2002/0061099 A1 May 23, 2002

(30) Foreign Application Priority Data

Nov. 17, 2000 (JP) .................................... 2000-351400

(51) Int. Cl.
*H04M 3/42* (2006.01)

(52) U.S. Cl. .............................. 379/211.02; 379/93.01; 379/93.11; 379/212.01; 379/214.01

(58) Field of Classification Search ............ 379/211.02, 379/212.01, 214.01, 93.09, 93.11
See application file for complete search history.

(56) References Cited

U.S. PATENT DOCUMENTS

| | | | |
|---|---|---|---|
| 4,788,718 A | 11/1988 | McNabb et al. | 379/112.08 |
| 5,027,384 A | 6/1991 | Morganstein | 379/88.02 |
| 5,592,541 A | 1/1997 | Fleischer, III et al. | 379/211.02 |
| 5,675,507 A | 10/1997 | Bobo, II | 709/20 |
| 5,894,504 A * | 4/1999 | Alfred et al. | 379/88.13 |
| 6,041,114 A * | 3/2000 | Chestnut | 379/211.02 |
| 6,058,178 A * | 5/2000 | McKendry et al. | 379/212.01 |
| 6,546,082 B1 * | 4/2003 | Alcendor et al. | 379/52 |
| 6,614,889 B1 * | 9/2003 | Perkins | 379/93.09 |
| 6,735,286 B1 * | 5/2004 | Hansen et al. | 379/52 |

FOREIGN PATENT DOCUMENTS

| | | | |
|---|---|---|---|
| EP | 0 810 765 A2 | * | 12/1997 |
| JP | 05-022454 | * | 1/1993 |
| JP | 7-38669 | | 2/1995 |
| JP | 11-205376 | * | 7/1999 |
| JP | 2000-316039 | * | 11/2000 |
| KR | 1999-24948 | | 4/1999 |
| WO | WO 94/22259 | | 9/1994 |
| WO | WO 99/01004 | | 1/1999 |
| WO | WO 00/70888 | | 11/2000 |

OTHER PUBLICATIONS

M. Hascoët, et al., Electrical Communication, Alcatel, XP-000736510, pp. 40–46, "Unifying and Networking Messaging Services", Mar. 21, 1998.

* cited by examiner

*Primary Examiner*—Quynh H. Nguyen
(74) *Attorney, Agent, or Firm*—Oblon, Spivak, McClelland, Maier & Neustadt, P.C.

(57) ABSTRACT

A communication system is provided, in which the communication system includes: a part for receiving a call establishment request from a communication terminal, and sending, to the communication terminal, a call forwarding destination information including information on at least a call forwarding destination; and a part for receiving information on a call forwarding destination which is selected by a caller from the communication terminal, and allowing the communication terminal and the call forwarding destination to communicate with each other according to the information on the call forwarding destination.

16 Claims, 6 Drawing Sheets

FIG.3

| | SUBSCRIBER NUMBER: 090-XXX-XXXX | | INCOMING CALL FORWARDING IS SET |
|---|---|---|---|
| | SERVICE MODES | FORWARDING DESTINATION | STATE |
| 1 | VOICE | 0468-YY-YYYY | ON |
| 2 | VOICE | 0468-YY-ZZZZ | ON |
| 3 | TV PHONE | 090-AAAA-AAAA | ON |
| 4 | E-MAIL | Abcd@xxx.yyy.com | ON |
| 5 | Fax | 0468-ZZ-YYYY | OFF |
| 6 | PHONE ANSWARING | PHONE ANSWERING CENTER | ON |
| 7 | CHAT (CHARACTER) | DESTINATION NW+IP ADDRESS | OFF |

INCOMING CALL FORWARDING COMMUNICATION SYSTEM AND THE METHOD

BACKGROUND OF THE INVENTION

1. Field of the Invention

The present invention relates to an incoming call forwarding technique in a communication system including a communication network and a communication terminal.

2. Description of the Related Art

For realizing incoming call forwarding in a conventional incoming call forwarding system, a user in a called side registers a call forwarding destination to the system beforehand. When an incoming call arrives at the user, the incoming call is automatically forwarded to the call forwarding destination. When the user wants to change the call forwarding destination, the user needs to change the registered settings from the called side.

According to the conventional technique, the incoming call is forwarded according to the call forwarding destination which is set beforehand. Or, when the incoming call arrives at a terminal of the user of the called side, the incoming call is forwarded according to an operation by the user of the called side.

However, according to the conventional call forwarding method, a user in a call originating side can not select the call forwarding destination and a communication mode for the call. Therefore, there is a problem in that the caller can not select a call forwarding destination and a method by which a call is sent to a call incoming side.

SUMMARY OF THE INVENTION

The object of the present invention is to provide a communication system in which a caller can specify a communication mode of a call forwarding destination side by an operation at a caller side.

In addition, an object of the present invention is to provide a communication system in which a call forwarding destination can be selected on the basis of an operation at the caller side.

The above object is achieved by a communication system including a part which communicates with a communication terminal, the communication system including:

a part for receiving a call establishment request from the communication terminal, and sending, to the communication terminal, a call forwarding destination information including information on at least a call forwarding destination; and a part for receiving information on a call forwarding destination which is selected by a caller from the communication terminal, and allowing the communication terminal and the call forwarding destination to communicate with each other according to the information on the call forwarding destination.

According to this invention, the caller can select a call forwarding destination since the call forwarding destination information is sent to the communication terminal.

The communication system may further includes:

a part for establishing a communication mode between the communication system and the communication terminal according to the information on the call forwarding destination.

Accordingly, the communication mode of the communication terminal can be agreed with that of the call forwarding destination.

The communication system may further includes:

a part for sending, to the communication terminal, information from which a caller selects a communication mode used for sending the call forwarding destination information to the communication terminal; and a part for establishing the communication mode selected by the caller between the communication system and the communication terminal, and sending the call forwarding destination information by the communication mode.

According to this invention, the caller can select a communication mode by which the communication terminal receives the call forwarding destination information.

The above object is also achieved by a communication system including a part which communicates with a communication terminal, the communication system including:

a part for receiving a call establishment request from the communication terminal, and sending, to the communication terminal, a call forwarding destination information including information on at least a call forwarding destination;

a part for receiving information on a call forwarding destination which is selected by a caller from the communication terminal;

a media conversion part for performing media conversion between communication modes of the call forwarding destination and the communication terminal; and a part for allowing the communication terminal and the call forwarding destination to communicate with each other via the media conversion part.

According to this invention, communication can be performed between different communication modes by using the media conversion part.

The communication system may further includes:

a part for sending information used for allowing a caller to select a communication mode to the communication terminal;

a part for establishing the communication mode selected by the caller between the communication system and the communication terminal; and wherein the media conversion part performs media conversion between the communication mode selected by the caller and a communication mode of the call forwarding destination.

In addition, the communication system may further includes:

a part for storing the call forwarding destination information with information indicating whether call forwarding is available or not for each subscriber number; and wherein the communication system sends the call forwarding destination information to the communication terminal when the call forwarding is available.

According to this invention, it can be judged whether call forwarding is available.

Further, in the communication system, the call forwarding destination information may include state information indicating call forwarding is available or not for each call forwarding destination, and the communication system sends information on call forwarding destinations in which the state information indicates that call forwarding is available as the call forwarding destination information.

According to this invention, only necessary information can be sent to the communication terminal as the call forwarding destination terminal.

DETAILED DESCRIPTION OF THE PREFERRED EMBODIMENTS

In the following, embodiments of the present invention will be described in detail with reference to figures.

(First Embodiment)

Figure 1:
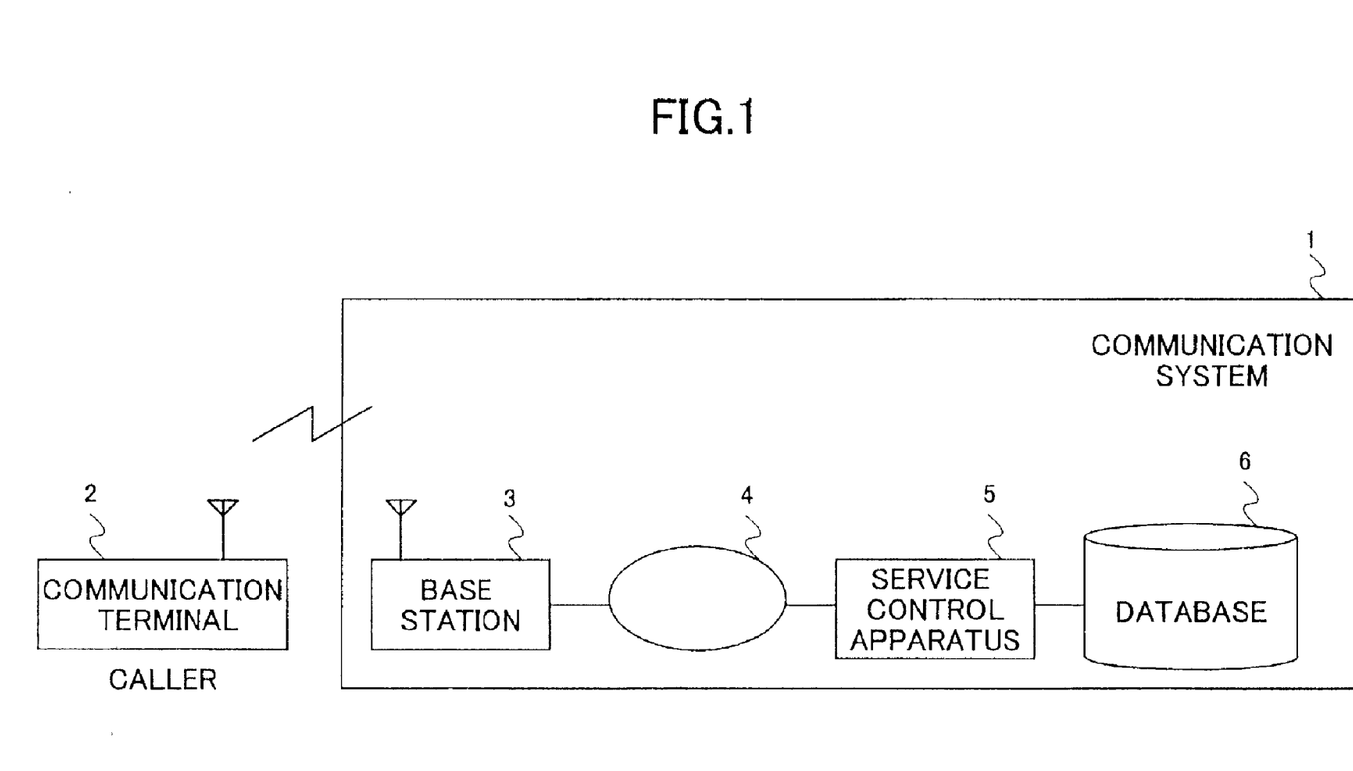
FIG. 1 shows a block diagram of a communication system in a first embodiment of the present invention.

FIG. 1 shows a block diagram of a communication system 1 in the first embodiment of the present invention. The communication system 1 is connected to a communication terminal 2 by radio. The communication system 1 includes a base station 3, a network 4, a service control apparatus 5 and a database 6.

The communication terminal 2 is a mobile wireless terminal which is connected to the network 4 via the base station 3. The communication terminal 2 can communicate with other terminals by a plurality of communication modes. In addition, the communication system 1 has a normal communication function for allowing a communication terminal to communicate with another terminal by using a subscriber number. The database 6 includes registration information registered by subscribers, and is connected to the service control apparatus 5. The service control apparatus 5 provides various services by referring to the database 6.

Next, an operation of the first embodiment of the present invention will be described with reference to a sequence chart shown in FIG. 2.

First, the communication terminal 2 sends a call establishment request which includes a subscriber number of a called party to the service control apparatus 5 in step 1. When the service control apparatus 5 receives the call establishment request, the service control apparatus 5 judges whether there is a setting of call forwarding for a user of the called side in step 2.

When the service control apparatus 5 verifies that there is a setting of call forwarding, the service control apparatus 5 sends a call forwarding destination information request to the database 6 in order to obtain a call forwarding destination information of the user of the called side in step 3.

Next, the database 6 which receives the call forwarding destination information request returns a call forwarding destination information response which includes the call forwarding destination information to the service control apparatus 5 in step 4. The service control apparatus 5 which receives the call forwarding destination information response sends a call forwarding destination information notification which includes the call forwarding destination information to the communication terminal 2.

In the following, a concrete example of the call forwarding destination information notification will be described.

Figure 2:
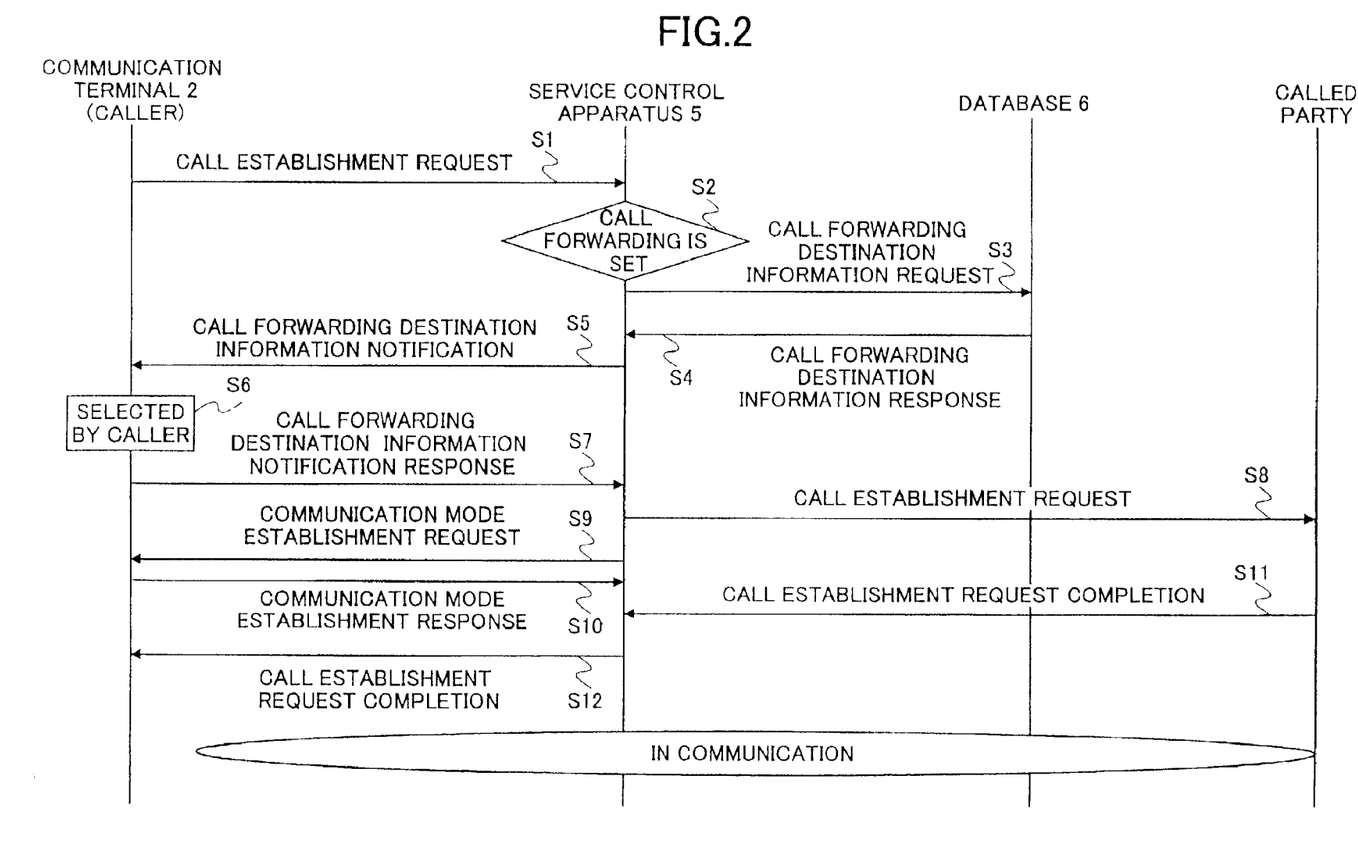
FIG. 2 is a sequence chart showing an operation of a communication system of the first embodiment of the present invention.
Figure 3:
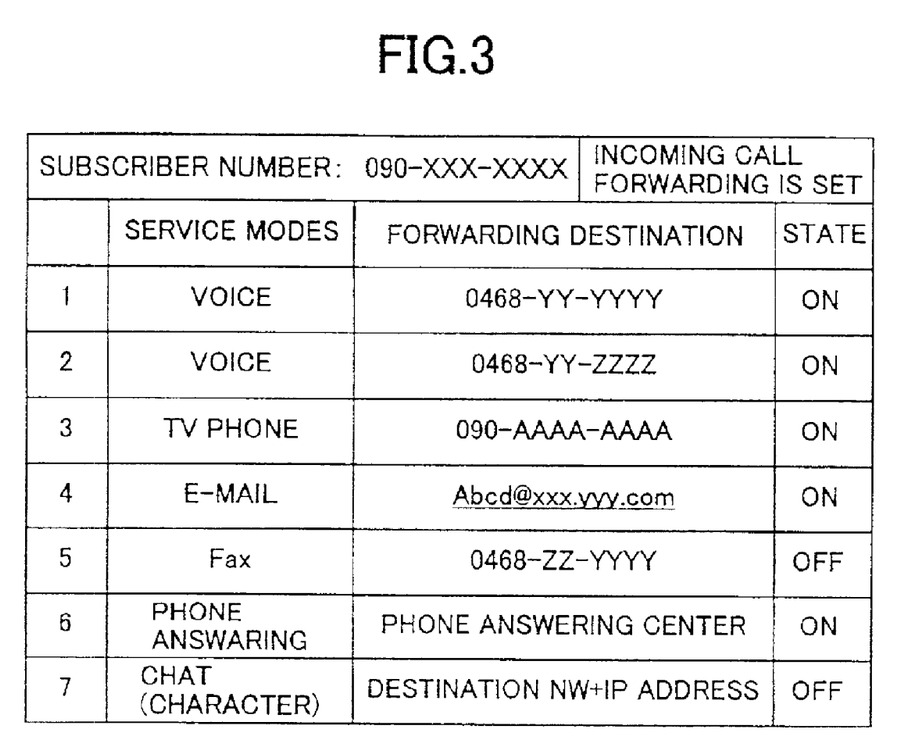
FIG. 3 shows an example of call forwarding destination information stored in a database.

As shown in FIG. 3, for example, the database stores call forwarding destination information associated with a subscriber number for each subscriber number, in which the call forwarding destination information includes information indicating whether incoming call forwarding is set or not (available or not), service modes, call forwarding destinations and states (ON or OFF). In the above-mentioned step 4, this call forwarding destination information of the corresponding subscriber is sent to the service control apparatus 5, and the caller (subscriber) receives the call forwarding destination information notification in step 5. This notification to the caller is performed by a voice guidance, for example. The whole information or a part of the information can be sent. The part of the information is, for example, only the service modes which have "ON" as the state. "ON" for the state means that the corresponding destination is in "forward available state", and, "OFF" means that the call forwarding destination is in "forward unavailable state".

In step 5 in FIG. 2, the communication terminal 2 receives the call forwarding destination information notification. Then, the caller checks the call forwarding destination information and selects a call forwarding destination in step 6. After that, the communication terminal 2 sends a call forwarding destination information notification response including selected call forwarding destination information to the service control apparatus 5 in step 7.

Next, the service control apparatus 5 sends a call establishment request to the called side (the call forwarding destination) according to the call forwarding destination information notification response in step 8, and the service control apparatus 5 sets a communication mode between the communication terminal 2 and the service control apparatus 5 to conform to the selected communication mode in step 9. That is, the service control apparatus 5 sends a communication mode establishment request to the communication terminal 2, and the communication terminal 2 returns a communication mode establishment response to the service control apparatus 5 in steps 9 and 10.

When the service control apparatus 5 receives a call establishment request completion in step 11, the service control apparatus 5 sends the call establishment request completion to the communication terminal 2 in step 12. After that, communication between the communication terminal 2 and the call destination is started.

(Second Embodiment)

Next, the second embodiment of the present invention will be described.

In the second embodiment, the caller can select a information notification mode for sending the call forwarding destination information from the service control apparatus 5 to the communication terminal 2. In this embodiment, a plurality of notification modes for sending the call forwarding destination information are registered in the service control apparatus 5 and the like beforehand. The system configuration of the second embodiment is the same as that of the first embodiment.

Figure 4:
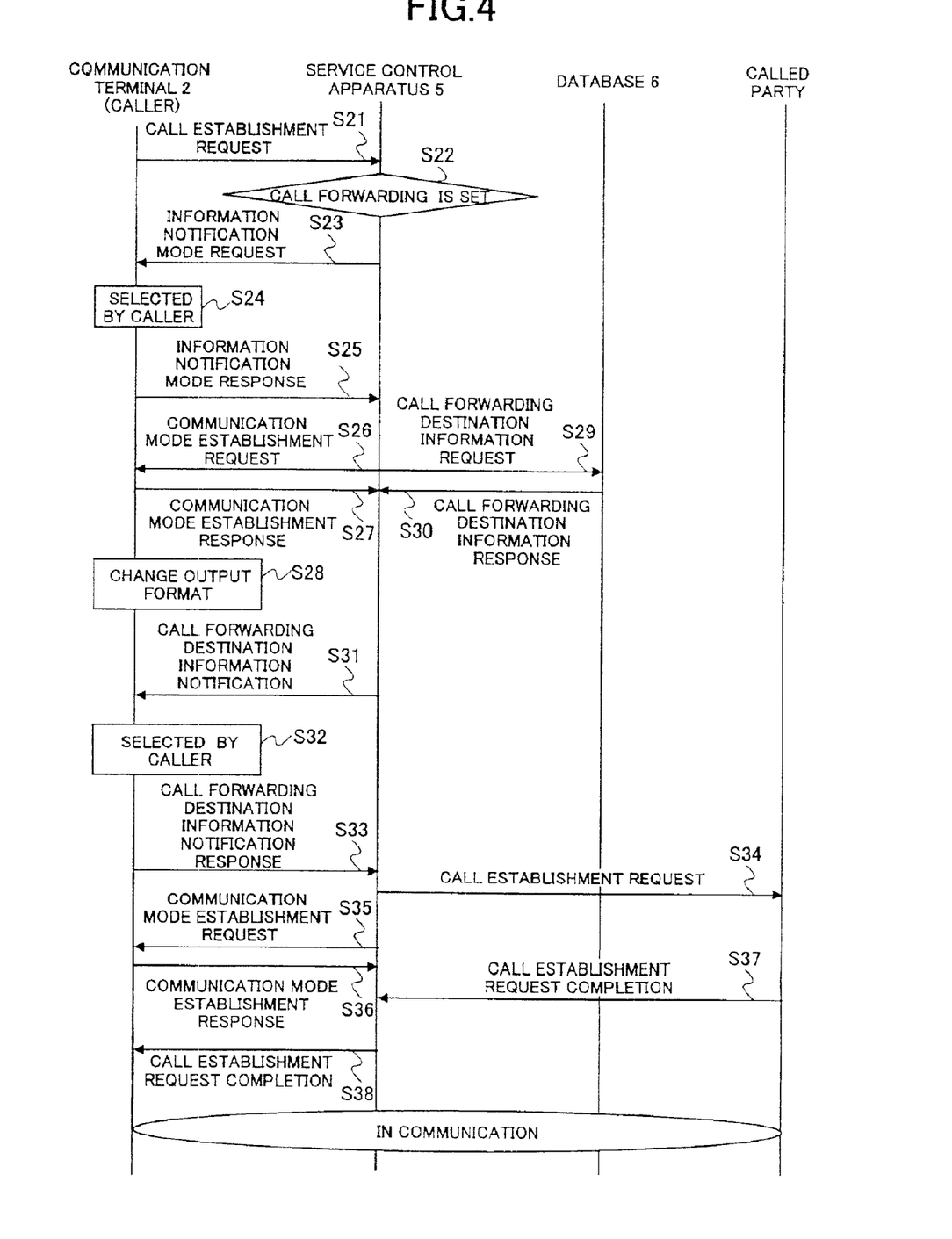
FIG. 4 is a sequence chart showing an operation of a communication system of a second embodiment of the present invention.

In the following, an operation of the communication system according to the second embodiment will be described with reference to a sequence chart shown in FIG. 4.

First, the communication terminal 2 sends a call establishment request to the service control apparatus 5 in step 21. When the service control apparatus 5 receives the call establishment request, the service control apparatus 5 judges whether there is a setting of call forwarding for the user of the called side in step 22.

When the service control apparatus 5 judges that there is a setting of call forwarding for the user of the called side, the service control apparatus 5 checks that a plurality of modes are registered as the notification modes for sending information to the communication terminal 2. Then, the service control apparatus 5 sends an information notification mode request to the communication terminal in step 23. When a caller recognizes the information notification mode request, the caller selects an information notification mode in step 24 and the communication terminal sends an information notification mode response to the service control apparatus 5 in step 25. For example, the caller can select a notification mode by selecting character information in response to a voice guidance from the service control apparatus 5.

Next, the service control apparatus 5 sends a communication mode establishment request to the communication terminal 2 in step 26 for making or changing communication settings such that the selected communication mode is realized. Then, the communication terminal 2 returns a communication mode establishment response to the service control apparatus 5 in step 27 and changes an output form for outputting information to the caller in step 28.

Next, the service control apparatus 5 sends a call forwarding destination information request to the database 6 in step 29 in order to obtain call forwarding destination information of a user of the called side. Then, the database 6 which receives the call forwarding destination information request returns a call forwarding destination information response including call forwarding destination information to the service control apparatus 5 in step 30. The service control apparatus 5 which receives the call forwarding destination information response sends a call forwarding destination information notification including call forwarding destination information to the communication terminal 2 in step 31.

In step 31, the communication terminal 2 receives the call forwarding destination information notification. Then, the caller checks the call forwarding destination information and selects a call forwarding destination by operating the communication terminal 2 in step 32. After that, the communication terminal 2 sends a call forwarding destination information notification response including the selected call forwarding destination information to the service control apparatus 5 in step 33.

Next, the service control apparatus 5 sends a call establishment request to the called side (the call forwarding destination) according to the call forwarding destination information notification response in step 34, and the service control apparatus 5 sets a communication mode between the communication terminal 2 and the service control apparatus 5 to conform to the selected communication mode. That is, the service control apparatus 5 sends a communication mode establishment request to the communication terminal 2 in step 35, and the communication terminal 2 returns a communication mode establishment response to the service control apparatus 5 in step 36.

When the service control apparatus 5 receives a call establishment request completion in step 37, the service control apparatus 5 sends the call establishment request completion to the communication terminal 2 in step 38. After that, communication between the communication terminal 2 and the called side is started.

In the second embodiment, the function for converting a communication mode to a communication mode which conforms to the request of the caller may be included either in the service control apparatus 5 or in the database 6. When it is necessary that the communication mode of the caller side agrees with that of the called side, the communication mode establishment can be performed after the call forwarding destination information notification response is received by the service control apparatus 5 so that communication between the communication terminal and the call forwarding destination can be performed by a communication mode.

(Third Embodiment)

Next, the third embodiment of the present invention will be described. In the third embodiment, medium conversion is performed between the calling side and the called side such that communication between different media is allowed.

Figure 5:
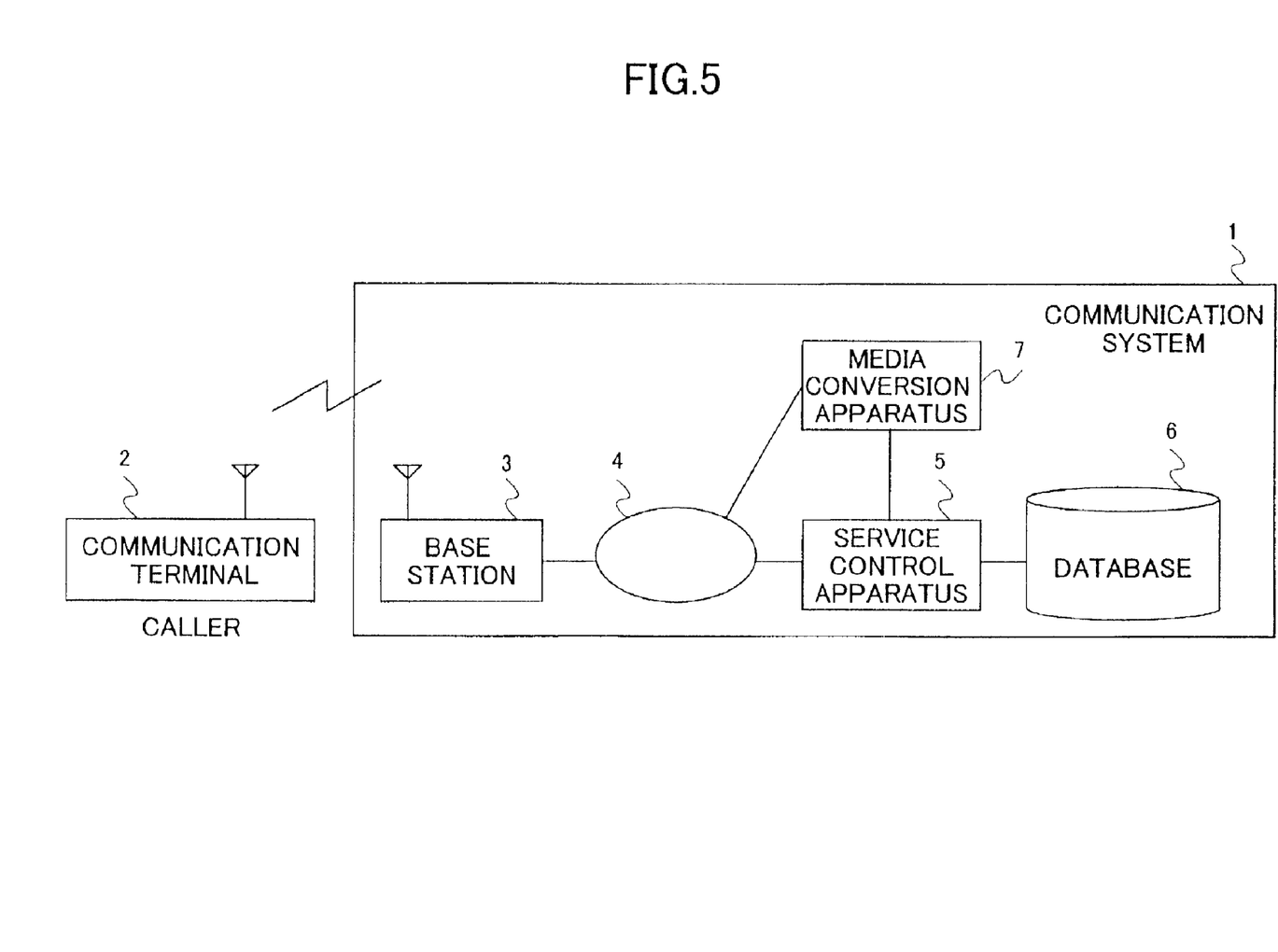
FIG. 5 shows a block diagram of a communication system in a third embodiment of the present invention.

FIG. 5 shows a block diagram of the communication system of the third embodiment. This configuration is different from that of the first embodiment in that this includes a medium conversion apparatus 7. The medium conversion apparatus 7 converts a communication mode to another communication mode and is connected to the service control apparatus 5.

Figure 6:
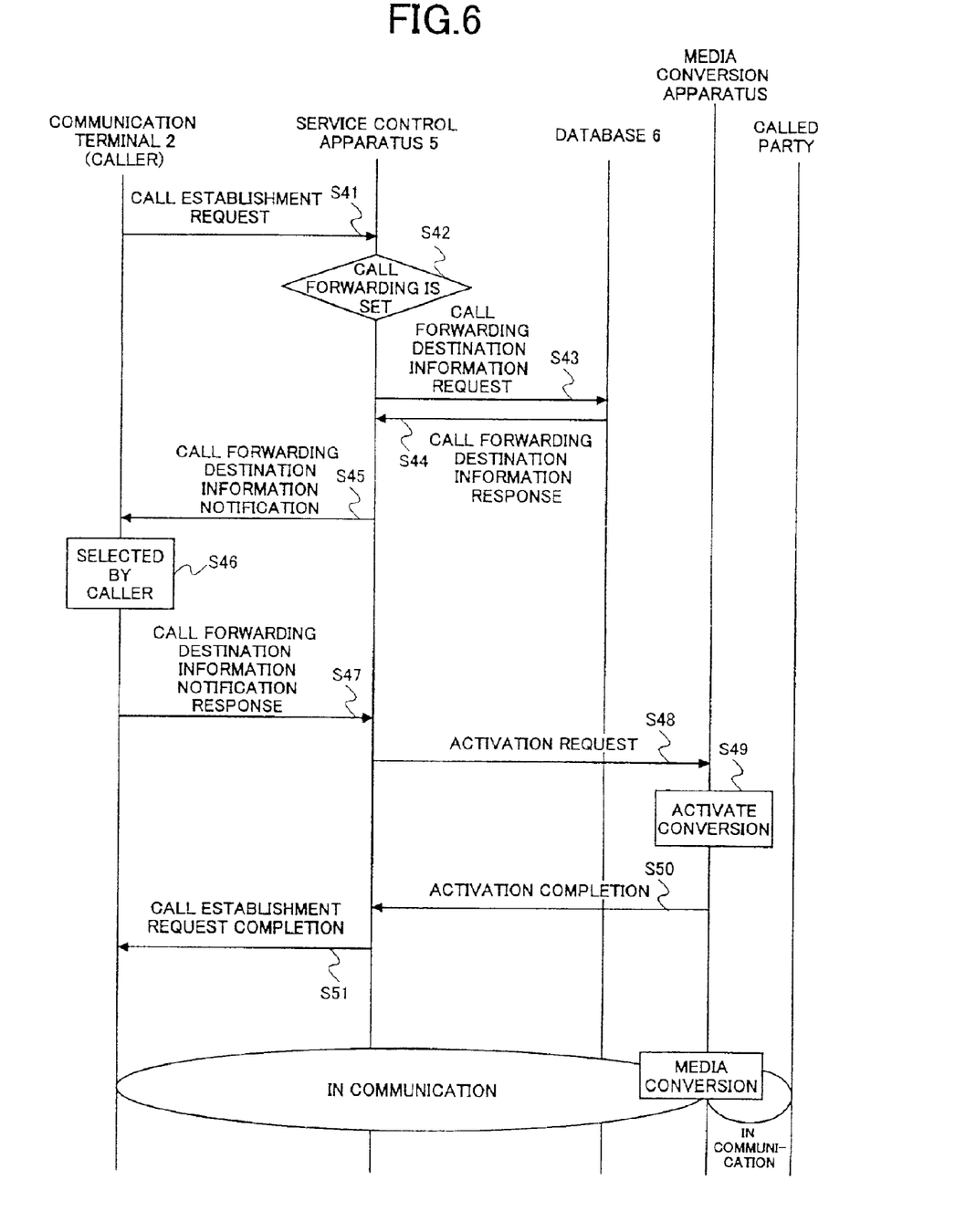
FIG. 6 is a sequence chart showing an operation of a communication system of a third embodiment of the present invention.

Next, the operation of the communication system of the third embodiment of the present invention will be described with reference to a sequence chart shown in FIG. 6.

First, the communication terminal 2 sends a call establishment request to the service control apparatus 5 in step 41. When the service control apparatus 5 receives the call establishment request, the service control apparatus 5 judges whether there is a setting of call forwarding for a user of the called side in step 42.

When the service control apparatus 5 verifies that there is a setting of call forwarding, the service control apparatus 5 sends a call forwarding destination information request to the database 6 in order to obtain call forwarding destination information in step 43. After the step 41 is performed, like the second embodiment, the system may allow the caller to select an information notification mode.

Next, the database 6 which receives the call forwarding destination information request returns a call forwarding destination information response which includes call forwarding destination information to the service control apparatus 5 in step 44. The service control apparatus 5 which receives the call forwarding destination information response sends a call forwarding destination information notification which includes call forwarding destination information to the communication terminal 2 in step 45.

In step 45, the communication terminal 2 receives the call forwarding destination information notification. Then, the caller checks the call forwarding destination information and selects a call forwarding destination by operating the communication terminal 2 in step 46. After that, the communication terminal 2 sends a call forwarding destination information notification response including the selected call forwarding destination information to the service control apparatus 5 in step 47.

Next, when the communication mode of the call forwarding destination side which is indicated by the call forwarding destination information notification response is different from that of the caller, the service control apparatus 5 sends an activation request including conversion information used for performing medium conversion to the medium conversion apparatus 7 in step 48.

The medium conversion apparatus 7 which receives the activation request activates the conversion function on the basis of the conversion information in step 49, and returns an activation completion message to the service control apparatus in step 50. Then, the service control apparatus 5 returns a call establishment request completion to the communication terminal 2 in step 51. Accordingly, communication starts via the medium conversion apparatus 7.

When the caller selects an information notification method like the second embodiment after step 41, communication can be performed between the selected communication mode of the caller and the communication mode of call forwarding destination via the medium conversion apparatus 7.

In addition, by providing a plurality of medium conversion apparatuses, the most suitable medium conversion apparatus can be selected according to the kind of medium conversion so that communication can be performed via the selected medium conversion apparatus.

As a concrete example, when the caller uses a voice terminal and a called side (a call forwarding destination) uses a character terminal, the medium conversion apparatus 7 performs voice/text conversion. In addition, when the call forwarding destination terminal uses e-mail which can be placed off-line, the medium conversion apparatus 7 may convert and store necessary information sent from the caller. After that, the medium conversion apparatus 7 may transfer the information to a mail server and the like.

Although examples in which the present invention is applied to a mobile wireless communication have been described, the present invention can be applied to other communication systems by providing apparatuses which correspond to the service control apparatus, the database and the medium conversion apparatus.

As mentioned above, according to the present invention, since call forwarding destination information which is registered beforehand is sent to a calling side, the caller can select a call forwarding destination and a communication mode.

The present invention is not limited to the specifically disclosed embodiments, and variations and modifications may be made without departing from the scope of the invention.

What is claimed is:

1. A communication system including a part which communicates with a communication terminal, said communication system comprising:
   a part configured to receive a call establishment request from said communication terminal, and to send, to said communication terminal, call forwarding destination information including a call forwarding destination;
   a part configured to receive information on a call forwarding destination which is selected by a caller from said communication terminal, and to allow said communication terminal and said call forwarding destination to communicate with each other according to said information on said call forwarding destination; and
   a part configured to establish a communication mode between said communication system and said communication terminal, said communications mode drawn from a list of at least three possible communications modes according to said information on said call forwarding destination, wherein
   said at least three possible communications modes comprising an email mode, a fax mode, and a chat mode.

2. The communication system as claimed in claim 1, further comprising:
   a part configured to send, to said communication terminal, information from which a caller selects said communication mode; and
   a part configured to establish said communication mode selected by said caller between said communication system and said communication terminal, and sending said call forwarding destination information by said communication mode.

3. The communication system as claimed in claim 1, said communication system comprising:
   a media conversion part configured to perform media conversion between communication modes of said call forwarding destination and said communication terminal,
   wherein said media conversion part is configured to perform the media conversion while said communication terminal and said call forwarding destination communicate with each other.

4. The communication system as claimed in claim 3, further comprising:
   a part configured to send to said communication terminal information used for allowing a caller to select said communication mode;
   a part configured to establish said communication mode selected by said caller between said communication system and said communication terminal,
   wherein said media conversion part performs media conversion between said communication mode selected by said caller and a communication mode of said call forwarding destination.

5. The communication system as claimed in claim 1, further comprising:
   a part configured to store said call forwarding destination information with information indicating whether call forwarding is available or not for each subscriber number,
   wherein said communication system sends said call forwarding destination information to said communication terminal when said call forwarding is available.

6. The communication system as claimed in claim 3, further comprising:
   a part configured to store said call forwarding destination information with information indicating whether call forwarding is available or not for each subscriber number,
   wherein said communication system sends said call forwarding destination information to said communication terminal when said call forwarding is available.

7. The communication system as claimed in claimed in claim 1, wherein
   said call forwarding destination information includes state information indicating whether call forwarding is available or not for each call forwarding destination, and
   said communication system is configured to send information on call forwarding destinations in which said state information indicates that call forwarding is available as said call forwarding destination information.

8. The communication system as claimed in claim 3, wherein
   said call forwarding destination information includes state information indicating whether call forwarding is available or not for each call forwarding destination, and
   said communication system is configured to send information on call forwarding destinations in which said state information indicates that call forwarding is available as said call forwarding destination information.

9. The communication method used for carrying out call forwarding by a communication system, comprising the steps of:
   receiving a call establishment request from a communication terminal;
   sending, to said communication terminal, a call forwarding destination information including information on at least a call forwarding destination;
   receiving information on a call forwarding destination which is selected by a caller from said communication terminal, and allowing said communication terminal and said call forwarding destination to communicate with each other according to said information on said call forwarding destination; and establishing a communication mode between said communication system and said communication terminal according to said information on said call forwarding destination, wherein said communications code drawn from a list of at least three possible communications modes, said list comprising an email mode, a fax mode, and a chat mode.

10. The communication method as claimed in claim 9, further comprising the steps of:

sending, to said communication terminal, information from which a caller selects a communication mode used for sending said call forwarding destination information to said communication terminal; and establishing said communication mode selected by said caller between said communication system and said communication terminal, and sending said call forwarding destination information by said communication mode.

11. The communication method as claimed in claim 1, further comprising the steps of:

performing media conversion between communication modes of said call forwarding destination and said communication terminal while said communication terminal and said call forwarding destination communicate with each other.

12. The communication method as claimed in claim 11, further comprising the steps of:

sending information used for allowing a caller to select a communication mode to said communication terminal;

establishing said communication mode selected by said caller between said communication system and said communication terminal; and performing media conversion between said communication mode selected by said caller and a communication mode of said call forwarding destination.

13. The communication method as claimed in claim 9, further comprising the steps of:

storing said call forwarding destination information with information indicating whether call forwarding is available or not for each subscriber number in said communication system; and sending said call forwarding destination information by said communication system sends to said communication terminal when said call forwarding is available.

14. The communication method as claimed in claim 11, further comprising the steps of:

storing said call forwarding destination information with information indicating whether call forwarding is available or not for each subscriber number in said communication system; and sending said call forwarding destination information by said communication system sends to said communication terminal when said call forwarding is available.

15. The communication method as claimed in claim 9, wherein said step of sending call forwarding destination information includes sending state information indicating whether call forwarding is available or not for each call forwarding destination, and the method further comprises sending, by said communication system, information on call forwarding destinations in which said state information indicates that call forwarding is available as said call forwarding destination information.

16. The communication method as claimed in claim 11, wherein said step of sending call forwarding destination information includes sending state information indicating whether call forwarding is available or not for each call forwarding destination, and the method further comprises sending, by said communication system, information on call forwarding destinations in which said state information indicates that call forwarding is available as said call forwarding destination information.

* * * * *